Aug. 21, 1956   J. D. CHRISTIAN   2,760,043
WELDING MACHINE
Filed June 11, 1953                     2 Sheets-Sheet 1
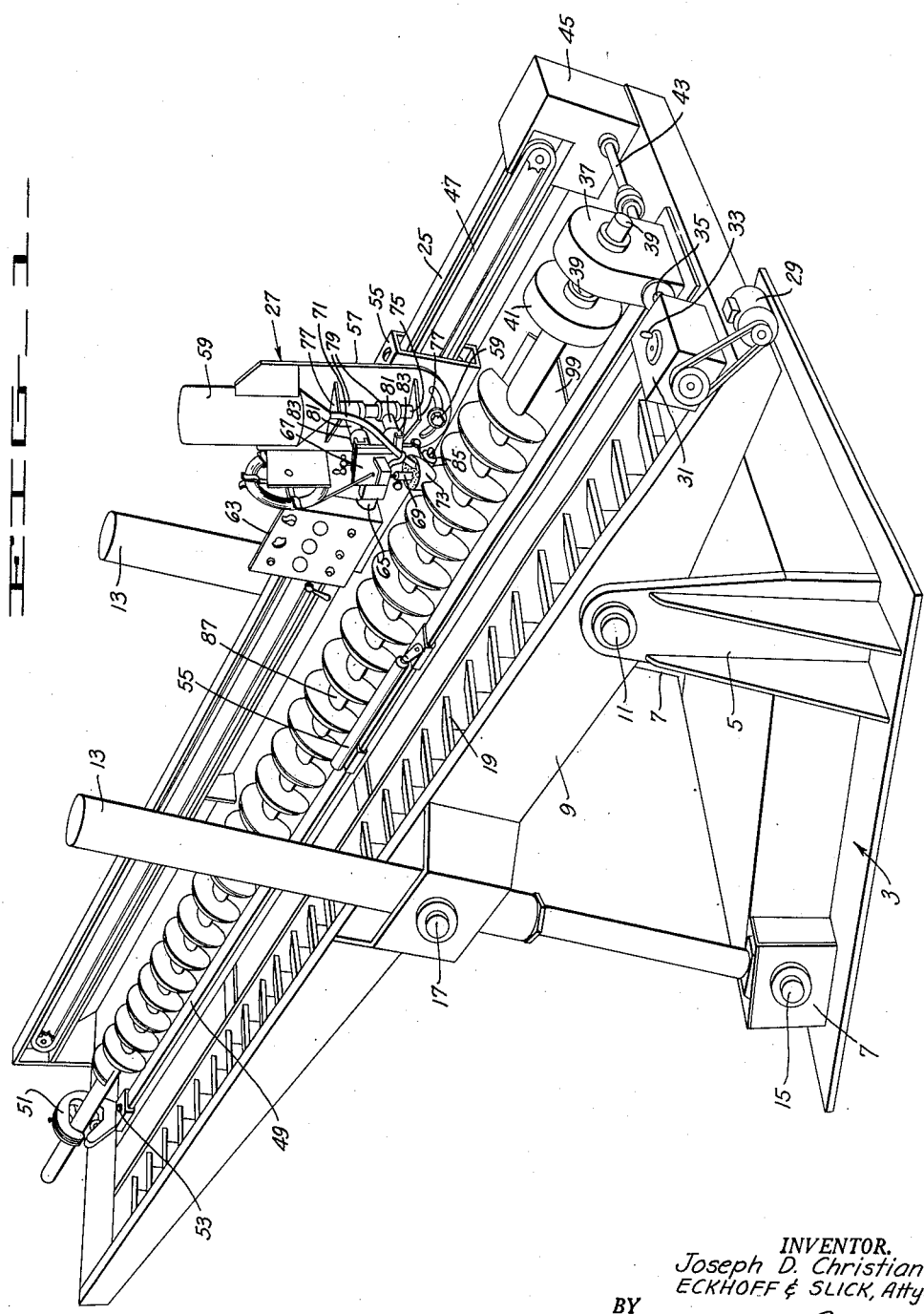
INVENTOR.
Joseph D. Christian
ECKHOFF & SLICK, Attys.
BY
A member of the firm Aug. 21, 1956  J. D. CHRISTIAN  2,760,043
WELDING MACHINE
Filed June 11, 1953  2 Sheets-Sheet 2
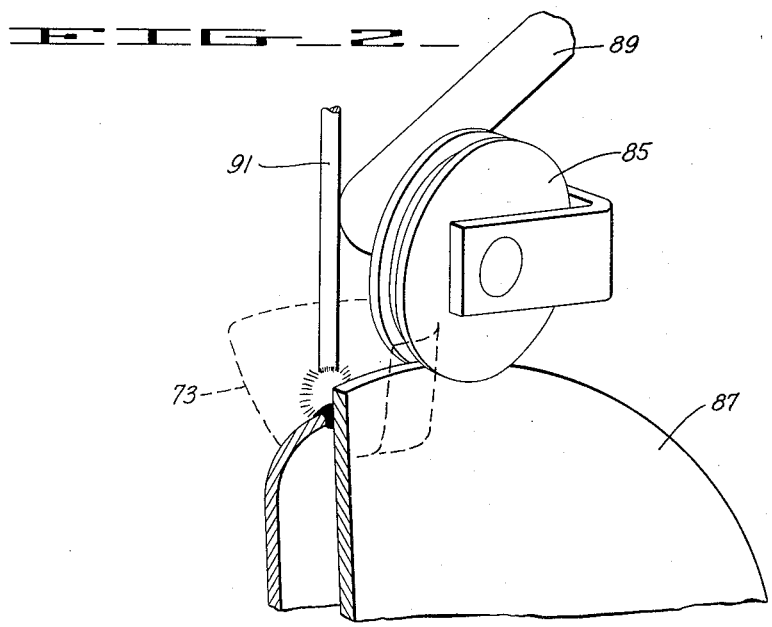
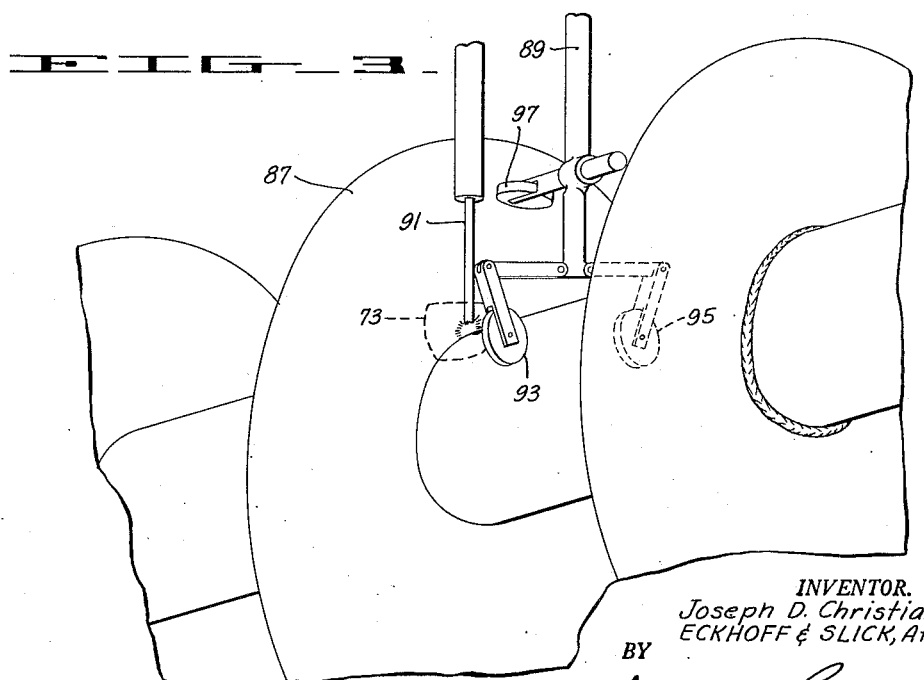
INVENTOR.
Joseph D. Christian
BY ECKHOFF & SLICK, Attys.
A member of the firm

United States Patent Office 2,760,043
Patented Aug. 21, 1956

2,760,043

WELDING MACHINE

Joseph D. Christian, San Francisco, Calif.

Application June 11, 1953, Serial No. 360,941

2 Claims. (Cl. 219—8)

This invention relates to a welding machine and a method of welding spiral coiled flights. In my prior patent, 2,321,185, June 8, 1943, I have disclosed a screw conveyor flight so constructed that a fluid can be passed through the flight in heat exchange relation to material in contact with the flight. The flight shown therein was provided with two helical flight faces joined to the tube or other standard supporting the flight and to each other, to provide a conduit for heat exchange fluid. In subsequent patent applications, I have disclosed and claimed conveyors for the heating or cooling of materials wherein two or more of such flights are interleaved with the adjacent flights being driven in opposite directions. Such devices may be utilized for many materials such as in the cooling or heating of salt, caustic, cement, sand and various other materials.

Heretofore, the fabrication of such heat exchange flights has been time-consuming because it was necessary to individually weld each of the flight faces by hand. This has been particularly difficult since such flights must run reasonably true in order that interleaved flights will not contact each other and in order that the clearance may be kept small between the flight proper and the casing. This is necessary to ensure complete contact of the material being treated with a heat exchange surface and also to prevent the degradation of material which might get between the edge of a flight and an adjacent flight and/or casing.

In accordance with the present invention, I have provided a means for accurately and rapidly welding flights such as those described in my foregoing patent and applications. Such machine provides for an accurate pitch of the flight, enables one to make a gas-tight bond which is free from undercutting, is non-porous and free from slag deposits or other defects. The present invention is particularly advantageous when applied to long flights and to those carrying gases or liquids under substantial pressure.

In general, I accomplish the objects of this invention by providing a welding machine which is made on a frame similar to that of a screw-cutting lathe, wherein the welding machine is positioned so that it will always be welding downward and wherein the welding machine proper is positioned to the general weld site by means independent of the helix being welded. The objects of this invention are further accomplished by a machine wherein the welding head is allowed to float slightly and may thus be accurately positioned over work which is slightly irregular in configuration.

It is apparent from the examination of my patent above referred to that a flight as is herein contemplated must have three weldments, one joining the two flight faces and two weldments, one joining each of the flight faces to the central tube or standard. The machine of the present invention is well adapted to make these three welds.

In the drawings:

Figure 1 is a perspective view of an embodiment of the present invention.

Figure 2 is a detail perspective view showing the action of the guide roller in making a weld on the periphery of a screw.

Figure 3 is a detail perspective view showing the action of the guide rollers in making a weld between a shaft and a flight.

Referring now to the drawings by reference characters, I have shown a device having a base 3, which is suitably made of steel structural member. The base 3 has attached thereto support members 5 at either end of the base 3. In the view shown, only one of the support members 5 is visible. The base 3 also has two support members 7, which serve as anchors. A carriage 9 is provided which is pivoted to the support member 5 at the pivot point designated 11. Two hydraulic rams 13 are provided which are pivoted to the anchor member 7 at point 15 and which are pivoted to the carriage 9 at the point 17. Hydraulic means are provided, not illustrated, to actuate the rams 13 so that the carriage 9 may be inclined to any desired angle relative to the base 3. The carriage, generally designated 9, contains a flight of steps 19. The carriage 9 has at one side thereof a rail member 25 on which is mounted a welding machine which has been generally designated 27. The frame 9 has also attached thereto a prime mover 29, suitably a reversible electric motor, which drives a variable speed mechanism 31, which has thereon a handle 33, which controls the speed of rotation of an output shaft 35. The output shaft 35 feeds power into a gear head 37, which transmits power to the shaft 39, to which is attached a work holding chuck 41. The gear head 37 also transmits power through the shaft 43 to a gear change mechanism 45, which in turn operates the endless chain drive 47. The carriage 9 also has a rail 49 at one end of which is attached an adjustable steady rest 51. The steady rest 51 slides upon the rail 49 and may be held in any desired position by tightening the bolt 53. An adjustable support rest 55 may also be provided upon the rail 49. In the case of short pieces of work, I can frequently dispense with the support rest 55, although its use is generally preferred.

The welding machine 27 is driven to approximate position by means of the chain 47. In other words, the gear change box 45 is so adjusted that with one revolution of the chuck 41 the welding machine 27 will be moved in the appropriate direction, the distance between two adjacent flights, on the assumption that the flight being welded has a single thread thereon.

The welding machine 27 consists of a rolling carriage member 55 which rolls along the rail 25 and is propelled by means of its attachment to the chain 47. The welding machine 27 has attached to the carriage member a main frame member 57 which is pivoted to the carriage 55 and held in a fixed position relative to the carriage member by a bolt 59. Thus, the frame member 57 can be adjusted to an angle to the carriage 55 in order that the welding machine 27 will remain at right angles to the base member 3 regardless of the angle to which the carriage 9 is adjusted.

Attached to the frame 57 is a flux hopper 59 and a reel 61 for holding a supply of welding rod. Attached to the carriage 55 is an electrical control panel 63, which controls the operation of the motor 29, as well as the flow of current to the welding equipment through the conduit 65. Attached to the frame 57 is the welding head 67, which is provided with an electrode holder 69, a tube supplying flux 71 and a shield 73. The welding equipment proper is conventional and well-known to those skilled in the art, and will not be described in detail but in general consists of a submerged arc continuous type welder wherein the arc is constantly submerged in a body of molten flux. The head 67 is mounted on the frame 57 by means of sliding members. Attached to the frame 57 is a rod 75, held in place by suitable brackets 77. Making a sliding fit with the rod 75 are the two bearing members 79, which are free to slide up and down over the rod 75 and which have attached thereto horizontal support members 81. Attached to the head 67 are two collars 83, which are free to slide over members 81. It is thus apparent that the welding head 67 has a limited degree of movement with respect to the support 57, i. e., it can move up and down, sideways or in and out, to a restricted degree. Attached to the head 67 are two rollers 85 (only one roller 85 is illustrated, its mate being hidden by the shield 73), and these rollers bear against the work 87 mounted on the machine.

It is thus apparent from the above description that a piece of work 87 can be mounted between the chuck 41 and the steady rest 51 and supported against a flexing by the support rest 55. As the work 87 is rotated by means of the motor 29 acting through the drive 31 and 39, the carriage 55 is moved in timed relationship to the work by the selection of suitable gearing in the box 45. Thus, if the distance between adjacent flights is 7 inches, the gearing in box 45 is selected so that the carriage 55 is moved 7 inches by one revolution of the shaft 39. Thus, the carriage 57 follows the general movement of the flights on the work 87. However, since the welding head 67 can move relative to the carriage 55, the rollers 85 can make the movement of the head 67 exactly conform to the work 87.

In Figure 2, the method of making a weld is shown in detail where the weld is on the periphery of a flight. The roller 85, held by the arm 89, follows the work 87, ensuring that the welding rod 91 is properly positioned.

In Figure 3, the machine is shown making a weld on the shaft. Here the arm 89 is used to support three rollers. Two of the rollers 93 and 95 bear on the shaft, while a third roller 97 bears on the face of a flight.

If desired, a flux catcher 99 may be employed. This catches surplus flux which drops from the work, so that it may be caught and reused.

In using the device of the present invention, the work 87 is first tacked lightly together, care being taken to secure accurate placement of each turn of the flights thereon. When the work 87 is mounted in place as is shown, the machine may be set for suitable welding conditions and will then continuously weld a seam along the edge of a flight or between the flight and the support without any substantial amount of supervision.

From the above description, it is apparent that by providing head on the welding machine, work pieces which are slightly irregular can be welded, since the roller 85 will make the welding head conform exactly to the work being welded. On the other hand, it is apparent that the work itself is not called upon to advance the welding machinery, but is only called upon to make minor adjustments in the position of the welding head. Thus, the work is not subjected to any great stress in welding a screw.

Although I have described the machine in connection with the welding of a hollow conveyor flight made in accordance with the above-mentioned patent, it will be apparent to those skilled in the art that the machine may be used for welding many articles of manufacturing having a somewhat similar configuration. Various modifications are possible in the machine as, for example, a positive gear change mechanism, such as that indicated at 45 in the drawing, can be substituted for the variable speed mechanism 31. The work holders and the work are suitably insulated and grounded, the details of this being well-known in the art and therefore being omitted.

I claim:

1. A welding apparatus for welding hollow screw flights and comprising a base, a frame tiltably mounted on said base, lifting means connected to the base and frame so as to tilt the frame to a required angle, a rotating work holder mounted on the frame, means mounted on the frame for driving the work holder rotatably, a welding carriage slidably mounted on the frame for sliding parallel to the axis of the screw flight, a shield adapted to contain molten flux, carrying means to carry an electrode dipping into the flux, a plurality of guide wheels, means supporting said shield, carrying means, and wheels floatably on said carriage whereby they float in unison according to variations in the parts being welded.

2. A welding apparatus for welding hollow screw flights and comprising a base, a frame tiltably mounted on said base, lighting means connected to the base and frame so as to tilt the frame to a required angle, a rotating work holder mounted on the frame, means mounted on the frame for driving the work holder rotatably, a welding carriage slidably mounted on the frame for sliding parallel to the axis of the screw flight, a carrier pivotally mounted on said carriage on a horizontal axis that is transverse to the axis of the flight, a rod mounted approximately vertically on said carrier, a pair of bearings mounted slidably on said rod, a pair of horizontal rods carried by said bearings, a pair of collars slidable on said horizontal rods, a welding head attached to said collars, a shield adapted to contain molten flux, carrying means to carry an electrode dipping into the flux, a plurality of guide wheels to contact the parts being welded, said shield, carrying means and wheels being all mounted on said head, means for traversing the welding carriage along parallel to the axis of the flight, and gearing means for driving said traversing means in timed relation to said means for driving the work.

References Cited in the file of this patent

UNITED STATES PATENTS

| | | |
|---|---|---|
| 2,299,747 | Harter | Oct. 27, 1942 |
| 2,427,350 | Carpenter et al. | Sept. 16, 1947 |
| 2,440,696 | Patterson | May 4, 1948 |
| 2,440,697 | Patterson | May 4, 1948 |
| 2,442,446 | Wallace | June 1, 1948 |